(12) United States Patent
Sato et al.

(10) Patent No.: US 8,349,519 B2
(45) Date of Patent: Jan. 8, 2013

(54) TITANIUM ELECTRODE MATERIAL AND SURFACE TREATMENT METHOD OF TITANIUM ELECTRODE MATERIAL

(75) Inventors: Toshiki Sato, Kobe (JP); Jun Suzuki, Kobe (JP); Yoshinori Ito, Kobe (JP); Jun Hisamoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 294 days.

(21) Appl. No.: 12/709,935

(22) Filed: Feb. 22, 2010

(65) Prior Publication Data

US 2010/0233587 A1    Sep. 16, 2010

(30) Foreign Application Priority Data

Mar. 11, 2009 (JP) ................. 2009-057806
Aug. 26, 2009 (JP) ................. 2009-194963

(51) Int. Cl.
*H01M 8/00* (2006.01)
(52) U.S. Cl. .................... 429/523; 429/535
(58) Field of Classification Search ............ 429/523, 429/535
See application file for complete search history.

(56) References Cited

U.S. PATENT DOCUMENTS

| 2006/0003174 A1 | 1/2006 | Yashiki et al. | |
| 2009/0211667 A1* | 8/2009 | Suzuki et al. | 148/281 |
| 2010/0035118 A1* | 2/2010 | Sato et al. | 429/34 |

FOREIGN PATENT DOCUMENTS

| JP | 10-228914 | 8/1998 |
| JP | 2000-294255 | 10/2000 |
| JP | 2001-6713 | 1/2001 |
| JP | 2006-97088 | 4/2006 |
| JP | 2008-166129 | 7/2008 |

OTHER PUBLICATIONS

U.S. Appl. No. 12/647,754, filed Dec. 28, 2009, Jun Suzuki et al.
U.S. Appl. No. 12/615,377, filed Nov. 10, 2009, Yoshinori Ito et al.
U.S. Appl. No. 12/594,825, filed Oct. 6, 2009, Shinichi Tanifuji et al.
U.S. Appl. No. 11/995,937, filed Jan. 17, 2008, Jun Suzuki et al.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

It is an object of the present invention to provide a titanium electrode material which is low in cost and is excellent in electric conductivity, corrosion resistance and hydrogen absorption resistance, and a surface treatment method of a titanium electrode material. A titanium electrode material includes: on the surface of a titanium material including pure titanium or a titanium alloy, a titanium oxide layer having a thickness of 3 nm or more and 75 nm or less, and having an atomic concentration ratio of oxygen and titanium (O/Ti) at a site having the maximum oxygen concentration in the layer of 0.3 or more and 1.7 or less; and an alloy layer including at least one noble metal selected from Au, Pt, and Pd, and at least one non-noble metal selected from Zr, Nb, Ta, and Hf, having a content ratio of the noble metal and the non-noble metal of 35:65 to 95:5 by atomic ratio, and having a thickness of 2 nm or more, on the titanium oxide layer. The surface treatment method of a titanium electrode material includes a titanium oxide layer formation step, an alloy layer formation step, and a heat treatment step.

8 Claims, 1 Drawing Sheet

TITANIUM ELECTRODE MATERIAL AND SURFACE TREATMENT METHOD OF TITANIUM ELECTRODE MATERIAL

FIELD OF THE INVENTION

The present invention relates to a titanium electrode material. More particularly, it relates to a titanium electrode material suitable for a separator made of titanium for a fuel cell, and a surface treatment method of a titanium electrode material.

BACKGROUND OF THE INVENTION

As distinct from a primary cell such as a dry battery, and a secondary battery such as a lead storage battery, a fuel cell is capable of continuously producing electric power by being continuously supplied with a fuel such as hydrogen and an oxidant such as oxygen. Such a fuel cell is high in electric power generation efficiency, is not largely affected by the size of the system, and causes less noises and vibrations. For these reasons, the fuel cell is expected as an energy source covering various applications and scales. Thus, fuel cells have been under development specifically as polymer electrolyte fuel cells (PEFC's), alkaline fuel cells (AFC's), phosphoric acid fuel cells (PAFC's), molten carbonate fuel cells (MCFC's), solid oxide fuel cells (SOFC's), biofuel cells, and the like.

A description will be given by taking a polymer electrolyte fuel cell as one example of fuel cells. Such a polymer electrolyte fuel cell includes a plurality of single cells stacked one on another each with an electrode referred to as a separator (or a bipolar plate) therebetween. Each single cell includes a solid polymer electrolyte membrane, and an anode electrode and a cathode electrode interposing the membrane therebetween.

The material for the separator for a fuel cell is required to have a characteristic of low contact resistance (meaning that a voltage drop occurs due to the interface phenomenon between the electrode and the separator surface), to be kept for a long period during use as a separator. From the viewpoints of this point and the processability and the strength in combination, a study has been conventionally made on applications of a metal material such as an aluminum alloy, stainless steel, a nickel alloy, or a titanium alloy.

For example, JP-A No. 10-228914 has a description on a separator for a fuel cell to the effect that stainless steel is used as a base material, and a gold plating is applied to the surface for manufacturing thereof. Whereas, for example, JP-A No. 2001-6713 describes as follows: stainless steel or a titanium material is used as a base material, and a noble metal or a noble metal alloy is deposited on the surface thereof; alternatively, after removing an oxide film on the base material surface, a noble metal or a noble metal alloy is deposited thereon. Whereas, for example, JP-A No. 2006-97088 describes as follows: a titanium material is used as a base material, and an oxide film on the surface is removed, and then, 1- to 100-nm island-like gold plating portions are interspersed thereon.

Each separator described in JP-A No. 10-228914, JP-A No. 2001-6713, and JP-A No. 2006-97088 uses a corrosion resistant metal such as stainless steel or titanium as a base material. For this reason, in a polymer electrolyte fuel cell using a hydrogen gas as a fuel, the separator is less susceptible to corrosion, and can keep a low contact resistance to a certain degree. However, in a direct methanol type fuel cell using a methanol aqueous solution as a fuel, which has been under development from the viewpoint that the fuel cell can be reduced in size, when methanol reacts with water on an electrode catalyst to form hydrogen, highly corrosive formic acid is also formed. Stainless steel or titanium is excellent in corrosion resistance because is forms a passive film on the surface. However, formic acid is a reducing acid, and hence it reduces and dissolves the passive film, thereby to corrode stainless steel or titanium. Therefore, when a gold-plated layer or the like includes pinholes, corrosion of the base material proceeds therefrom. Particularly, when the proportion of pinholes is large, corrosion proceeds from the pinhole areas at the interface between the base material immediately under the gold-plated layer or the like and the gold-plated layer or the like. As a result, much peeling of the gold-plated layer or the like occurs, resulting in an increase in contact resistance. This may lead to reduction of the performances of the fuel cell. Further, peeling of the gold-plated layer or the like causes corrosion to further proceed. As a result, the solid polymer electrolyte membrane may be deteriorated by metal ions dissolved from the base material. In contrast, it can be considered that the gold-plated layer or the like is increased in thickness to minimize pinholes. However, noble metals such as gold are expensive. Further, the plating time increases, resulting in reduction of productivity. This unfavorably incurs a higher cost of the separator.

For the separators described in JP-A No. 2001-6713 and JP-A No. 2006-97088, in order to enhance the electric conductivity, the oxide film on the surface of the base material made of titanium is removed. Then, in order to prevent the formation of an oxide film again, an electric conductive layer of a noble metal, an electrically conductive resin, or the like is provided under a prescribed conditions such as a vacuum atmosphere or a reducing atmosphere. This is for the following reason. Removal of the oxide film can enhance the electric conductivity. On the other hand, hydrogen becomes more likely to penetrate into the base material, which causes a concern about embrittlement of the base material due to penetration of hydrogen in the long view.

Herein, the separator for a fuel cell is required to have both high electric conductivity and high corrosion resistance. However, the separator for use on the methanol electrode side is further required to have a hydrogen absorption resistance: the separator is further required to be resistant to mechanical embrittlement due to absorption of hydrogen formed due to decomposition of methanol. However, a pure titanium material or a titanium alloy material tends to absorb hydrogen to be embrittled as the characteristic of the material. A common method for inhibiting the hydrogen absorption includes a method in which a titanium oxide layer is formed on the surface. However, the titanium oxide layer is an insulation layer. Therefore, with this method, the electric conductivity is reduced.

SUMMARY OF THE INVENTION

The present invention was made in view of the foregoing problems. It is an object of the present invention to provide a titanium electrode material which is low in cost and is excellent in electric conductivity, corrosion resistance, and hydrogen absorption resistance, and a surface treatment method of a titanium electrode material, for manufacturing the titanium electrode material.

The present inventors conducted a close study in order to solve the foregoing problems. As a result, they found as follows. The surface of a titanium material is treated under prescribed conditions, and a prescribed alloy is deposited thereon. This can improve the electric conductivity, the corrosion resistance, and the hydrogen absorption resistance. This finding led to the completion of the present invention.

A titanium electrode material in accordance with the present invention which solved the foregoing problem is characterized by including: a titanium material including pure titanium or a titanium alloy; a titanium oxide layer having a thickness of 3 nm or more and 75 nm or less, and having an atomic concentration ratio (O/Ti) of oxygen and titanium at a site having the maximum oxygen concentration in the layer of 0.3 or more and 1.7 or less, on the surface of the titanium material; and an alloy layer including at least one noble metal selected from Au, Pt, and Pd, and at least one non-noble metal selected from Zr, Nb, Ta, and Hf, having a content ratio of the noble metal and the non-noble metal (noble metal:non-noble metal) of 35:65 to 95:5 by atomic ratio, and having a thickness of 2 nm or more, on the titanium oxide layer.

Thus, by forming the titanium oxide layer with a specific thickness on the surface of the titanium material, it is possible to improve the hydrogen absorption resistance. Further, by specifying the atomic concentration ratio of oxygen and titanium in the titanium oxide layer at a specific ratio, the electric conductivity is improved. Then, by forming the alloy layer, the electric conductivity can be improved while improving the corrosion resistance. Further, by specifying the content ratio of prescribed noble metal and non-noble metal at prescribed content ratio, the occurrence of pinholes is inhibited. This eliminates a fear of reduction of the contact resistance.

A surface treatment method of a titanium electrode material in accordance with the present invention which solved the foregoing problem, is characterized by including: a titanium oxide layer formation step of forming a titanium oxide layer with a thickness of 10 nm or more and 80 nm or less on the surface of a titanium material including pure titanium or a titanium alloy; an alloy layer formation step of forming an alloy layer including at least one noble metal selected from Au, Pt, and Pd, and at least one non-noble metal selected from Zr, Nb, Ta, and Hf, having a content ratio of the noble metal and the non-noble metal (noble metal:non-noble metal) of 35:65 to 95:5 by atomic ratio, and having a thickness of 2 nm or more by a PVD process, on the titanium oxide layer; and a heat treatment step of heat treating the titanium material including the alloy layer formed thereon at a temperature of 300° C. or more and 800° C. or less.

Thus, the titanium oxide layer is formed with a specific thickness on the surface of the titanium material in the titanium oxide layer formation step. This can improve the hydrogen absorption resistance. Then, by forming the alloy layer in the alloy layer formation step, the electric conductivity can be improved while improving the corrosion resistance. Further, by performing a heat treatment in the heat treatment step, a part of oxygen in the titanium oxide layer is caused to diffuse into the titanium material. This results in an oxygen deficient type titanium oxide layer. As a result, the electric conductivity can be further improved.

In the present invention, the titanium oxide layer formation step preferably includes: performing a heat treatment at a temperature of 200° C. or more and 600° C. or less in the air; performing an anodizing oxidation treatment at a voltage of 100 V or less; or performing an oxidation treatment in a passive state forming atmosphere of titanium, on the titanium material. With any of these methods, it is possible to easily form a titanium oxide layer on the surface of the titanium electrode material, which can impart a high hydrogen absorption resistance.

In the present invention, it is preferable to perform an acid pickling treatment step of subjecting the surface of the titanium material to an acid pickling treatment in a solution containing a non-oxidizing acid prior to performing the titanium oxide layer formation step. By this procedure, it is possible to remove dirt present and a natural oxide layer ununiformly formed on the surface of the titanium material. Therefore, it is possible to form a uniform titanium oxide layer in the titanium oxide layer formation step.

The titanium electrode material in accordance with the present invention is excellent in electric conductivity, corrosion resistance, and hydrogen absorption resistance. For this reason, when a separator for a fuel cell is manufactured using the titanium electrode material of the present invention, and is used for a fuel cell, there is produced an effect of allowing the excellent electric conductivity, corrosion resistance, and hydrogen absorption resistance to be held for a long period.

In accordance with the surface treatment method of a titanium electrode material in accordance with the present invention, a titanium oxide layer is formed on the surface of the titanium material including pure titanium or a titanium alloy, and further, an alloy layer is formed, and thus, a heat treatment is performed. This can result in a titanium electrode material low in cost, and excellent in electric conductivity, corrosion resistance, and hydrogen absorption resistance.

For this reason, for example, when a separator for a fuel cell is manufactured using the titanium electrode material subjected to a surface treatment with the surface treatment method of a titanium electrode material of the present invention, and is used for a fuel cell, there is produced an effect of allowing the excellent electric conductivity, corrosion resistance, and hydrogen absorption resistance to be held for a long period.

DETAILED DESCRIPTION OF THE PREFERRED EMBODIMENTS

<Titanium Electrode Material>

Figure 1:
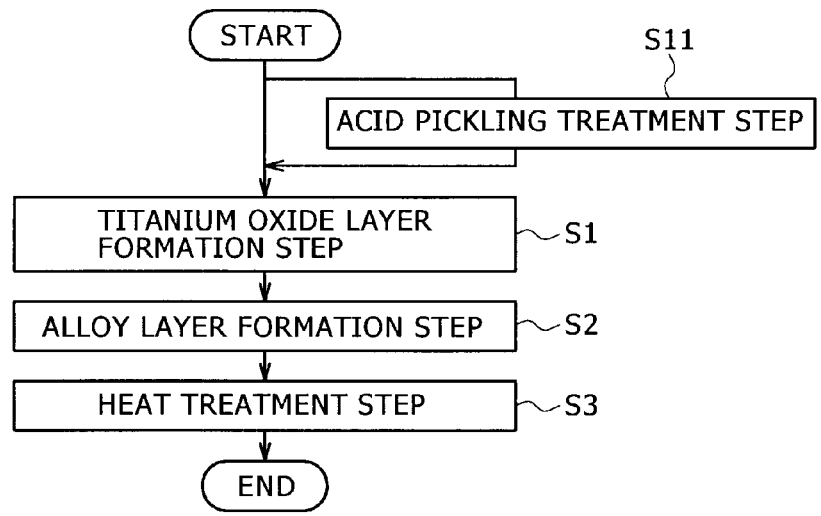
FIG. 1 is a flowchart for illustrating the flow of a surface treatment method of a titanium electrode material in accordance with the present invention.

First, a titanium electrode material in accordance with the present invention will be described in details.

The titanium electrode material in accordance with the present invention has a prescribed titanium oxide layer on the surface of a titanium material including pure titanium or a titanium alloy (which will be appropriately referred to as a titanium base material), and has a prescribed alloy layer on the titanium oxide layer (outermost surface). The titanium electrode material can be used as a separator for a fuel cell.

Below, respective configurations will be described.

[Titanium Base Material]

A titanium base material includes pure titanium or a titanium alloy.

Herein, examples of pure titanium or a titanium alloy may include classes 1 to 4 pure titaniums specified in JIS H 4600, and titanium alloys such as Ti—Al, Ti—Ta, Ti-6Al-4V, and Ti—Pd. Incidentally, class 1 or 2 pure titaniums specified in JIS H 4600, and α alloy are preferable from the viewpoints of cost and processability. However, pure titaniums and titanium alloys usable in the present invention are not limited thereto. There may also be preferably used those having compositions corresponding to those of the pure titaniums including other metal elements or the like, or the titanium alloys. Incidentally, the surface(s) of the titanium base material mean(s) one side or both sides of the titanium base material. Further, the titanium base material is used for electrodes. The titanium base material for electrodes (titanium electrode material) is subjected to a surface treatment, resulting in a titanium electrode material excellent in electric conductivity, corrosion resistance, and hydrogen absorption resistance.

The thickness of such a titanium base material has no particular restriction. However, for example, when the titanium base material is used for a separator for a fuel cell, the thickness is preferably set at 0.05 to 0.3 mm. This is for the following reason. When the thickness of the titanium base material is set within such a range, the resulting titanium base material can have a strength and a handling property as a plate material while processing into such a thickness is relatively easy. It is naturally understood that the thickness may be set at less than 0.05 mm, or more than 0.3 mm, if required.

[Titanium Oxide Layer]

For the titanium oxide layer, the thickness is 3 nm or more and 75 nm or less, and the atomic concentration ratio (O/Ti) of oxygen and titanium at a site having the maximum oxygen concentration in the layer is 0.3 or more and 1.7 or less.

(Thickness: 3 nm or More and 75 nm or Less)

When the thickness of the titanium oxide layer is less than 3 nm, sufficient hydrogen absorption resistance and corrosion resistance cannot be obtained. On the other hand, when the thickness of the titanium oxide layer exceeds 75 nm, sufficient electric conductivity cannot be obtained. The thickness of such a titanium oxide layer can be adjusted by the conditions in a titanium oxide layer formation step S1 and the conditions for the heat treatment in a heat treatment step S3 as described later. The measurement of the thickness of the titanium oxide layer can be confirmed, for example, by observing the cross section by a transmission electron microscope (TEM). As one example, the following is carried out. A test plate is cut out for TEM observation. Then, the cut surface is processed by means of a focused ion beam apparatus, thereby to be reduced in thickness to 100 nm or less, resulting in a test piece. The test piece for observation is observed under a condition of an acceleration voltage of 200 kV by means of a TEM, thereby to measure the thickness of the titanium oxide layer.

(Atomic Concentration Ratio of Oxygen and Titanium (O/Ti): 0.3 or More and 1.7 or Less)

When the value of O/Ti is less than 0.3, the hydrogen absorption resistance and the corrosion resistance are deteriorated. On the other hand, when the value of O/Ti exceeds 1.7, oxygen in the titanium layer has not sufficiently diffused into the titanium base material. Accordingly, an oxygen-deficient type titanium oxide is not formed, resulting in deterioration of the electric conductivity. Such a value of O/Ti can be adjusted by the conditions for the heat treatment in a heat treatment step S3 described layer. The value of O/Ti is the value at a site having the maximum oxygen concentration in the titanium oxide layer. Herein, the wording "the value at a site having the maximum oxygen concentration in the titanium oxide layer" denotes the value at a site (depth position) of the titanium oxide layer at which O shows a peak by X-ray photoelectron spectroscopic analysis, and based on the values of the Ti concentration (atomic percent) and the O concentration (atomic percent) at a given point in the titanium oxide layer. Incidentally, the reason why the value of O/Ti is measured at a site showing a peak of O is as follows. When the value at this site satisfies the scope of the present invention, it can be said that O and Ti are well balanced throughout the titanium oxide layer.

The value of O/Ti can be determined in the following manner. For example, by means of a fully automatic scanning type X-ray photoelectron spectrometer, X-ray photoelectron spectrometry is carried oat to analyze the composition of the region from the outermost surface of the alloy layer to a depth of 100 nm toward the titanium oxide layer. Thus, using the analyzed values of the Ti concentration (atomic percent) and the O concentration (atomic percent) at a site having the maximum oxygen concentration (the position at a depth showing the peak of O (showing the maximum concentration)) in the titanium oxide layer, O/Ti is calculated. Incidentally, the atomic concentration ratio (O/Ti) of oxygen and titanium is preferably 1.0 or more and 1.7 or less, and more preferably 1.0 or more and 1.5 or less.

[Alloy Layer]

The alloy layer contains at least one noble metal selected from Au, Pt, and Pd, and at least one non-noble metal selected from Zr, Nb, Ta, and Hf. The content ratio of the noble metal and the non-noble metal (noble metal:non-noble metal) is 35:65 to 95:5, and the thickness is 2 nm or more.

It is known that Au, Pt, and Pd are excellent in corrosion resistance in spite of not forming a passive film on the surface, and are excellent in electric conductivity because they are transition elements. Therefore, the noble metal (noble metal element) forming the alloy layer is appropriately selected from these. Whereas, non-noble metals (non-noble metal elements) are required to be high in corrosion resistance to formic acid, and to tend to combine with oxygen or titanium. As the non-noble metal elements, at least one selected from Zr, Nb, Ta, and Hf is used. The non-noble metal elements also exhibit, as with titanium, a corrosion resistance by forming a passive film on the surface. However, as distinct from the passive film of titanium, the passive film of the non-noble metal element is also resistant to corrosion by formic acid. Therefore, the non-noble metal elements show a high corrosion resistance in formic acid. The non-noble metal elements each strongly combine with oxygen or titanium in titanium oxide on the titanium oxide layer. Therefore, the non-noble metal elements are each less likely to diffuse to the surface upon precipitation on the titanium oxide layer in the alloy layer formation step S2 described later. For this reason, it can be considered that the non-noble metal elements each form a nucleus in the film growth initial process, and further, form a large number of nuclei.

On the other hand, the simultaneously precipitated noble metal elements are considered to tend to diffuse to the surface on the titanium oxide layer. Thus, it can be considered as follows. The noble metal elements diffuse to the surface, and are incorporated in the large number of nuclei formed, so that the nuclei grow. As a result, a dense film with less pinholes is formed. Further, Zr, Nb, Ta, and Hf strongly combine with oxygen or titanium, and hence are also excellent in adhesion. On the other hand, it is considered as follows. With only noble metals, the noble metal atoms precipitated on the titanium oxide layer easily diffuse to the surface, resulting in a small nucleus formation density. Even when nuclei grow to a certain degree to form island-like crystals, the distance between islands is large. Therefore, pinholes are not eliminated unless the film thickness is large.

In the alloy layer of the present invention, the content ratio of the noble metal element and the non-noble metal element (noble metal element:non-noble metal elements) is 35:65 to 95:5 by atomic ratio. Namely, the content ratio is 35 atomic percent:65 atomic percent to 95 atomic percent:5 atomic percent. Further, in other words, the alloy layer includes the noble metal elements in an amount of 35 to 95 atomic percent, and non-noble metal elements in an amount of 5 to 65 atomic percent. When the noble metal composition is higher than 95 atomic percent, the nucleus formation density at the deposition initial stage is low, so that pinholes become less likely to be eliminated. More preferably, the content ratio is 85 atomic percent or less, and most preferably 80 atomic percent or less. On the other hand, when the noble metal composition ratio is less than 35 atomic percent, the area ratio or the thickness of the oxide film of Zr, Nb, Ta, or Hf formed on the alloy layer surface increases. This may cause a reduction of the contact resistance. Incidentally, the content ratio of the noble metal elements and the non-noble metal elements is preferably 40:60 to 60:40 by atomic ratio. Further, in the present invention, Au, Pt, and Pd are all equivalent as noble metal elements. Zr, Nb, Ta, and Hf are all equivalent as non-noble metal elements. The noble metal elements and the non-noble metal elements can provide the same effect in any combination so long as they satisfy the atomic ratio. The content ratio of the noble metal elements and the non-noble metal elements (noble metal elements:non-noble metal elements) can be measured with, for example, the ICP (Inductively Coupled Plasma) atomic emission spectrometry. As one example, calculation is performed in the following manner. Using an acid solution (aqua regia) capable of dissolving both the alloy layer and the titanium base material, a test plate is dissolved. Then, the concentrations of the noble metal elements and the non-noble metal elements in the resulting solution are measured, and the sum is normalized to 100%.

The thickness of the alloy layer is required to be 2 nm or more. When the thickness of the alloy layer is less than 2 nm, a large number of pinholes are formed. Therefore, when the layer is immersed in a formic acid solution, corrosion proceeds. The preferred thickness of the alloy layer is 3 nm or more, and the further preferred thickness of the alloy layer is 5 nm or more. On the other hand, the upper limit of the thickness of the alloy layer has no particular restriction. However, the thickness is more preferably thinner from the viewpoint of the cost because a noble metal is required. For example, the thickness is preferably set at 500 nm or less.

The content ratio of the noble metal elements and the non-noble metal elements, and the thickness of the alloy layer are controlled by the deposition conditions in an alloy layer formation step S2 described later.

<Surface Treatment Method>

Then, by reference to FIG. 1, the surface treatment method of a titanium electrode material in accordance with the present invention will be described in details.

As shown in FIG. 1, the surface treatment method of a titanium electrode material in accordance with the present invention includes a titanium oxide layer formation step S1, an alloy layer formation step S2, and a heat treatment step S3.

Below, the contents of respective steps will be described.

[Titanium Oxide Layer Formation Step]

The titanium oxide layer formation step S1 is a step of forming a titanium oxide layer with a thickness of 10 nm or more and 80 nm or less on the surface of a titanium material including pure titanium or a titanium alloy (which will be hereinafter appropriately referred to as a titanium base material). The titanium base material is as illustrated in connection with the titanium electrode material, and hence, a description thereon will be omitted herein.

The formation of the titanium oxide layer on the surface of the titanium base material can be carried out by any of the methods: (1) a heat treatment is carried out in an air atmosphere; (2) an anodic oxidation treatment is carried out at a voltage of 100 V or less; and (3) an oxidation treatment is carried out in a passive state forming atmosphere of titanium. Below, respective methods will be described.

(Heat Treatment in an Air Atmosphere)

On the surface of a general titanium base material including pure titanium or a titanium alloy, a natural oxide layer with a thickness of about 10 nm is formed by oxygen in the air. However, the state is ununiform. Thus, in order to impart sufficient hydrogen absorption resistance and corrosion resistance as the titanium electrode material, it is preferable that a heat treatment is carried out in an air atmosphere to form a uniform oxide layer (titanium oxide layer) with a thickness of 10 nm or more. When the thickness of the titanium oxide layer is less than 10 nm, the thickness of the titanium oxide layer in the titanium electrode material heat treated in the heat treatment step S3 becomes less than 3 nm. As a result, sufficient hydrogen absorption resistance and corrosion resistance cannot be obtained. On the other hand, when the thickness of the titanium oxide layer exceeds 80 nm, the thickness of the titanium oxide layer in the titanium electrode material heat treated in the heat treatment step S3 exceeds 75 nm. As a result, sufficient electric conductivity cannot be obtained. The thickness of such a titanium oxide layer can be adjusted by the conditions (temperature and time) for the heat treatment as described later. The measurement of the thickness of the titanium oxide layer can be confirmed by observing the cross section with a transmission electron microscope (TEM) in the same manner as described above.

The heat treatment temperature is set at 200° C. or more and 600° C. or less. When the heat treatment is carried out at more than 600° C. in an air atmosphere, the oxidizing speed becomes very high. As a result, a too thick titanium oxide layer is formed for a short time. This makes it difficult to enhance the electric conductivity even when the alloy layer formation step S2 and the heat treatment step S3 described later are carried out. On the other hand, when the heat treatment temperature is less than 200° C., the titanium oxide layer is less likely to be formed. The heat treatment temperature is preferably 250° C. or more and 580° C. or less, and more preferably 300° C. or more and 550° C. or less. The heat treatment time is required to be appropriately adjusted according to the heat treatment temperature. Further, although depending upon the heat treatment temperature, the heat treatment time is preferably set at 1 minute or more and 5 minute or less. When the heat treatment time is less than 1 minute, the thickness of the titanium layer may not be sufficiently increased. On the other hand, when the heat treatment time exceeds 5 minutes, the thickness of the titanium oxide layer may become too large.

For example, the relation between the heat treatment temperature and the heat treatment time, and the thickness of the titanium oxide layer is as follows. When a heat treatment is carried out at 200° C. for 5 minutes, a titanium oxide layer with a thickness of about 10 nm is formed. When a heat treatment is carried out at 300° C. for 5 minutes, a titanium oxide layer with a thickness of about 15 nm is formed. When a heat treatment is carried out at 400° C. for 5 minutes, a titanium oxide layer with a thickness of about 20 nm is formed. When a heat treatment is carried out at 500° C. for 3 minutes, a titanium oxide layer with a thickness of about 35 nm is formed. When a heat treatment is carried out at 600° C. for 3 minutes, a titanium oxide layer with a thickness of about 60 nm is formed. Further, when a heat treatment is carried out at 650° C. in excess of the range of the heat treatment temperature in the present invention for 3 minutes, a titanium oxide layer with a thickness of about 85 nm is formed. When a heat treatment is carried out at 700° C. for 2 minutes, a titanium oxide layer with a thickness of about 90 nm is formed. Thus, the thickness of the titanium oxide layer increases for a short heat treatment time.

(Anodic Oxidation Treatment)

By subjecting a titanium base material including pure titanium or a titanium alloy to an anodic oxidation treatment, it is also possible to form a titanium oxide layer on the surface. It is known that the thickness of the titanium oxide layer formed by the anodic oxidation treatment roughly depends upon the voltage during the treatment. When the voltage is 100 V or less, the thickness of the titanium oxide layer can be controlled to 80 nm or less. Therefore, the voltage during the anodic oxidation treatment is set at 100 V or less.

For the electrolyte for use in the anodic oxidation treatment, aqueous solutions of sulfuric acid, phosphoric acid, acetic acid, boric acid, and the like are used singly, or a mixed solution thereof. The thickness of the resulting titanium oxide layer varies according to the combination of the type and concentration of the electrolyte, the treatment temperature, the voltage, and the treatment time. Therefore, appropriate adjustment is made so that the thickness becomes 10 nm or more and 80 nm or less. For example, when an anodic oxidation treatment is carried out at room temperature (20 to 25° C.) using a 1 mass % phosphoric acid aqueous solution as the electrolyte, a 20-minute treatment at 20 V results in a titanium oxide layer with a thickness of about 15 nm; a 20-minute treatment at 50 V results in a titanium oxide layer with a thickness of about 40 nm; and a 20-minute treatment at 100 V results in a titanium oxide layer with a thickness of about 80 nm.

(Oxidation Treatment in a Passive State Forming Atmosphere)

By subjecting a titanium base material including pure titanium or a titanium alloy to an oxidation treatment in a passive state forming atmosphere, it is also possible to form a titanium oxide layer on the surface. For example, when a titanium base material is immersed in a hydrochloric acid aqueous solution, at a pH of the solution of less than 0.5, titanium dissolves. However, at a pH of 0.5 or more, a passive film is formed. Such a state is referred to as a "passive state forming atmosphere". By controlling the temperature and the time of the oxidation treatment in a passive state forming atmosphere, the thickness of the passive film, i.e., the titanium oxide layer can be controlled. Namely, desirably, the conditions for oxidation are appropriately adjusted so that the thickness of the titanium oxide layer is 10 nm or more and 80 nm or less.

For example, when a hydrochloric acid aqueous solution with a pH of 2 is used, a 240-hour treatment at 50° C. results in a titanium oxide layer with a thickness of about 25 nm; a 240-hour treatment at 100° C. results in a titanium oxide layer with a thickness of about 40 nm; a 240-hour treatment at 150° C. results in a titanium oxide layer with a thickness of about 70 nm; and a 240-hour treatment at 200° C. results in a titanium oxide layer with a thickness of about 100 nm. Thus, the thickness of the titanium oxide layer increases.

The titanium oxide layers formed with the respective methods are different in crystallinity of titanium oxide according to the method. The titanium oxide layer formed by the heat treatment in an air atmosphere includes crystalline titanium oxide. Each titanium oxide layer formed by the anodic oxidation treatment and the oxidation treatment in a passive state forming atmosphere includes amorphous titanium oxide. The crystalline titanium oxide is superior in corrosion resistance and hydrogen absorption resistance. However, it has been shown that even amorphous titanium oxide exhibits sufficient performances in the atmosphere in a fuel cell. Therefore, the titanium oxide layer formation step S1 may be carried out by any of the methods. Further, these methods are not exclusive.

The step S1 can also be carried out with other methods capable of forming a titanium oxide layer on the surface of the titanium base material.

Preferably, prior to performing the titanium oxide layer formation step S1, an acid pickling treatment step S11 of acid pickling a titanium material (titanium base material) is performed. For example, when the thickness of the titanium base material is as small as 0.3 mm or less, a heat treatment or rolling is performed until the material is processed to such a thickness. For this reason, the state of dirt on the titanium base material surface and the state of the natural oxide layer often variously vary. Also in order to form a uniform titanium oxide layer on the titanium base material surface, the following procedure is preferable. The titanium base material is immersed in an acid solution to remove the dirt and the natural oxide layer on the surface. Then, again, as described above, a titanium oxide layer is formed in the titanium oxide layer formation step S1. Preferred examples of the acid solution for use in the acid pickling treatment step S11 include an aqueous solution obtained by appropriately diluting a mixture of a single substance or a mixture of two or more of non-oxidizing acids such as hydrofluoric acid, hydrochloric acid, and sulfuric acid, and further one or more of nitric acid and hydrogen peroxide. For example, a mixed aqueous solution of a 1 mass % hydrofluoric acid and 5 mass % nitric acid can be used. Further, the acid pickling treatment may be carried out in one step or in two or more divided steps.

[Alloy Layer Formation Step]

The alloy layer formation step S2 is a step of forming an alloy layer including at least one noble metal selected from Au, Pt, and Pd, and at least one non-noble metal selected from Zr, Nb, Ta, and Hf, having a content ratio of the noble metals and the non-noble metals (noble metals:non-noble metals) of 35:65 to 95:5 by atomic ratio, and having a thickness of 2 nm or more on (the outermost surface) of the titanium oxide layer formed in the titanium oxide layer formation step S1 with a PVD process.

As the method for forming the alloy layer, there is used a PVD process such as a sputtering process, a vacuum deposition process, or an ion plating process. A PVD process can form at least one noble metal selected from Au, Pt, and Pd, and at least one non-noble metal selected from Zr, Nb, Ta, and Hf in the target composition on the surface of the titanium oxide layer. Particularly, with a sputtering process, by using an alloy target of the noble metal and the non-noble metal with the target composition, or by simultaneously sputtering two kinds of targets of a noble metal and a non-noble metal while adjusting the sputtering power, a film with roughly the target composition can be deposited. Further, a PVD process can control the film thickness of a several-nanometer level. For this and other reasons, deposition is easy. Further, an alloy layer can be formed over a relatively wide area, and hence the productivity is improved.

The noble metals and the non-noble metals, the content ratio thereof, the thickness of the alloy layer, and the like are as described in connection with the titanium electrode material. Therefore, herein, a description thereon will be omitted.

[Heat Treatment Step]

The heat treatment step S3 is a step of heat treating the titanium material (titanium base material) on which the titanium oxide layer and the alloy layer have been formed in the foregoing manner at a temperature of 300° C. or more and 800° C. or less.

By the heat treatment of the heat treatment step S3, respective elements in the alloy layer and the titanium oxide layer mutually diffuse. As a result, the adhesion between the two layers is further enhanced, and the electric conductivity is enhanced. Further, the titanium oxide layer is heat treated with supply of oxygen cut off by the alloy layer on the surface. Accordingly, oxygen in the titanium oxide layer diffuses toward the titanium base material, so that a part or the whole thereof is converted into oxygen-deficient titanium oxide (titanium oxide having an oxygen deficient gradient structure). Thus, it can be considered as follows. The oxygen-deficient titanium oxide comes in the same state as that of an n type semiconductor which is enhanced in electric conductivity when it is more deficient in oxygen than the stoichiometric ratio. For this reason, the electric conductivity can be improved.

Incidentally, the thickness of the titanium oxide layer varies between before and after the heat treatment step S3. The reason for this is as follows.

An alloy layer is formed on the outermost surface of the titanium electrode material. Therefore, in the heat treatment step S3, supply of oxygen is cut off to the titanium oxide layer formed in the titanium oxide layer formation step S1. For this reason, oxygen in the titanium oxide layer diffuses into the titanium base material, so that titanium oxide is converted into oxygen-deficient type titanium oxide (having an oxygen deficient gradient structure). For this reason, after the heat treatment step S3, the thickness of the titanium oxide layer slightly decreases. Incidentally, such an oxygen-deficient type crystallized high-temperature titanium oxide becomes more likely to be formed with a decrease in oxygen partial pressure in the heat treatment.

In order to obtain such effects, the heat treatment temperature in the heat treatment step S3 is required to be set at 300° C. or more and 800° C. or less. When such a heat treatment temperature is less than 300° C., diffusion of oxygen in the titanium oxide layer is slow. This impractically requires a long-time heat treatment for improving the electric conductivity. In other words, oxygen in the titanium oxide layer does not sufficiently diffuse into the titanium base material. Thus, in order to make the atomic concentration ratio (O/Ti) of oxygen and titanium in the titanium oxide layer small within a prescribed range, a long-time heat treatment becomes necessary. Further, when such a heat treatment temperature exceeds 800° C., the diffusion speed of elements of the alloy layer and the titanium base material is too high. Accordingly, atoms of the alloy layer and titanium or a titanium alloy mutually diffuse excessively. For this reason, titanium diffuses to the surface of the alloy layer. Thus, when titanium is exposed to formic acid environment, corrosion proceeds, which increases the contact resistance, resulting in deterioration of the electric conductivity. Further, oxygen in the titanium oxide layer diffuses into the titanium base material excessively, so that the titanium oxide layer after the heat treatment decreases in thickness. Further, the atomic concentration ratio (O/Ti) of oxygen and titanium in the titanium oxide layer becomes too small. Incidentally, the preferred heat treatment temperature is 330° C. or more and 650° C. or less. The more preferred heat treatment temperature is 350° C. or more and 600° C. or less. Incidentally, even within such a temperature range, a long-time heat treatment causes titanium to diffuse to the surface of the alloy layer, resulting in the formation of a naturally oxidized titanium oxide layer. For this reason, the heat treatment time is required to be appropriately adjusted with respect to the heat treatment temperature.

The heat treatment step S3 is preferably carried out under an atmosphere having an oxygen partial pressure of $2.1 \times 10^4$ Pa or less (an oxygen partial pressure under an air atmosphere or less). Incidentally, in the present invention, the oxygen partial pressure represents the pressure of oxygen in a heat treatment furnace for carrying out the heat treatment step S3 (incidentally, in the present invention, the composition of the air is assumed as follows: nitrogen:oxygen is roughly 4:1). For example, when the film thickness of the alloy layer is as relatively small as 3 to 5 nm, the heat treatment is preferably carried out for as short as about 1 to 15 minutes in an atmosphere with an oxygen partial pressure equal to or less than the oxygen partial pressure in an air atmosphere. When the alloy layer has a thickness of 50 nm or more, even a heat treatment in an air atmosphere for about 10 to 50 minutes provides a favorable result. Whereas, when an alloy layer with a content of the noble metal elements within the range of 35 to 55 atomic percent by atomic ratio is heat treated at a high temperature (e.g., 500° C.), a lower oxygen partial pressure results in more excellent electric conductivity and corrosion resistance. Thus, it is desirable that the oxygen partial pressure, temperature and time are appropriately adjusted by the film thickness of the alloy layer and the content ratio of the noble metal elements. The oxygen partial pressure is preferably 13.33 Pa or less, and further preferably 1.33 Pa or less.

The heat treatment step S3 can be carried out by using a conventionally known heat treatment furnace such as an electric furnace or a gas furnace capable of reducing the pressure in the furnace. Further, as a method for performing a heat treatment under a reduced oxygen partial pressure, there is a method to be carried oat in an atmosphere of an inert gas such as argon or nitrogen.

The present invention is as described up to this point. However, in executing the present invention, other steps such as an unnecessary substance removing step of removing unnecessary substances such as dirt, a dry step of drying the washed titanium base material, or a cooling step of cooling the titanium electrode material after a heat treatment may be included between, or before or after the respective steps in such a range as not to adversely affect the respective steps.

EXAMPLES

Below, Examples in which the effects of the present invention were observed will be described as compared with Comparative Examples not satisfying the requirements of the present invention.

[First Embodiment]

In a First Embodiment, the effects of the components/composition, and film thickness of an alloy layer formed on a titanium base material subjected to a heat treatment in an air atmosphere as the titanium oxide layer formation step S1 were evaluated.

(Surface Treatment of Test Plate)

A test plate used was treated in the following manner. A titanium base material (width 2 cm×length 5 cm×thickness 0.2 mm) including class 1 pure titanium specified according to JIS H 4600 was subjected to ultrasonic washing in acetone as the acid pickling treatment step S11. Then, the titanium base material was subjected to an acid pickling treatment in a mixed aqueous solution of 1 mass % hydrofluoric acid and 5 mass % nitric acid, was washed with pure water, and was dried. Then, as the titanium oxide layer formation step S1, a heat treatment was carried out in an air atmosphere at 500° C. for 3 minutes. The thickness of the titanium oxide layer formed on the heat-treated test plate surface was measured by transmission electron microscope (TEM) observation.

For TEM observation, a test plate was cut out, and the cut side was processed by means of a focused ion beam processing apparatus (FB-2000A manufactured by Hitachi Ltd.) to be as thin as 100 nm or less, resulting in a test piece. The test piece for observation was observed under the condition of an accelerating voltage of 200 kV by means of a TEM (HF-2000 field emission type transmission electron microscope manufactured by Hitachi Ltd.), thereby to measure the thickness of the titanium oxide layer. The film thickness of the titanium oxide layer was found to be 35 nm.

Then, as the alloy layer formation step S2, on the titanium base material after formation of the titanium oxide layer, an alloy layer was formed by means of a sputtering process. The a film thickness of 8 nm on the surface of the titanium base material including the titanium oxide layer formed thereon. Thus, the heat treatment step S3 was carried out. Incidentally, a reference sign "-" in Table 1 denotes the one not including a non-noble metal element. Further, the thickness of the titanium oxide layer after the heat treatment in the heat treatment process S3 was measured by means of TEM observation.

TABLE 1

| | Alloy layer components and composition | | Thickness of alloy layer (nm) | Thickness of titanium oxide layer after heat treatment step (nm) | Contact resistance (mΩ·cm²) | |
|---|---|---|---|---|---|---|
| | Noble metal kind and composition | Non-noble metal kind and composition | | | Initial value | Immersion value |
| Example 1 | Au79at % | Ta21at % | 3 | 31 | 5.2 | 7.9 |
| Example 2 | Au60at % | Ta40at % | 6 | 30 | 4.0 | 4.8 |
| Example 3 | Au51at % | Zr49at % | 8 | 30 | 3.9 | 4.2 |
| Example 4 | Pt89at % | Hf11at % | 10 | 32 | 3.3 | 7.8 |
| Example 5 | Pt82at % | Nb18at % | 10 | 31 | 3.5 | 6.5 |
| Example 6 | Au59at % | Hf41at % | 20 | 30 | 3.7 | 3.9 |
| Example 7 | Au45at % | Ta55at % | 10 | 28 | 3.5 | 4.3 |
| Comparative Example 1 | Au100at % | — | 8 | 32 | 4.2 | 75 |
| Comparative Example 2 | Au31at % | Ta69at % | 10 | 28 | 7.5 | 180 |
| Comparative Example 3 | Pt60at % | Zr40at % | 1.5 | 30 | 9.8 | 56 | titanium base material was set on a substrate stage in a chamber of a magnetron sputtering apparatus. Each sputtering target of various alloys including noble metal elements and non-noble metal elements was attached on an electrode in the chamber. Then, the inside of the chamber was evacuated to a vacuum of 0.00133 Pa ($1\times10^{-5}$ Torr) or less. Then, an argon gas was introduced into the chamber, and adjustment was made so that the pressure was 0.266 Pa ($2\times10^{-3}$ Torr). Then, the electrode including the alloy sputtering target attached thereon was applied with DC (direct-current voltage) to excite an argon gas. As a result, an argon plasma is generated, thereby to perform sputtering of the alloy. Thus, an alloy layer of each component/composition and each thickness shown in Table 1 was formed on the surface of the titanium base material. Further, the titanium base material was turned upside down. Thus, the same alloy layer was also formed on the back side of the titanium base material in the same manner.

The content ratio (atomic ratio) of noble metal elements and non-noble metal elements in the alloy layer of the resulting test plate was measured with an ICP (Inductively Coupled Plasma) atomic emission spectrometry. As the measurement apparatus, ICPS-8000 (manufactured by Shimadzu Corp.) was used. Specifically, using an acid solution (aqua regia) capable of dissolving both the alloy layer and the titanium base material, the test plate was dissolved. Then, the concentrations of the noble metal elements and the non-noble metal elements in the resulting solution are measured, and the sum was normalized to 100%. Thus, the content ratio (atomic ratio) of noble metal elements and non-noble metal elements in the alloy layer was calculated.

Finally, as the heat treatment step S3, the titanium base material including the alloy layers formed on both the sides thereof was heat treated in a vacuum atmosphere of 0.00665 Pa at 400° C. for 5 minutes, resulting in a test plate.

Incidentally, as comparison (Comparative Example 1), in the same manner as described above, Au was deposited with (Evaluation of Electric Conductivity and Corrosion Resistance)

A test for confirming the electric resistance and the corrosion resistance was carried out in the following manner. Each test plate was measured for the contact resistance values in terms of the value after the heat treatment step S3 (initial value) and the value after 1000-hour immersion in a 80° C. aqueous solution obtained by mixing and adding formic acid and methanol (an aqueous solution obtained by adding formic acid in an amount of 1 mass % to a 50 vol % methanol aqueous solution) (formic acid-methanol aqueous solution)) (immersion value), respectively. The measured values were compared with each other. Each contact resistance initial value, and each contact resistance value after 1000-hour immersion in a formic acid-methanol aqueous solution are shown in Table 1.

Figure 2:
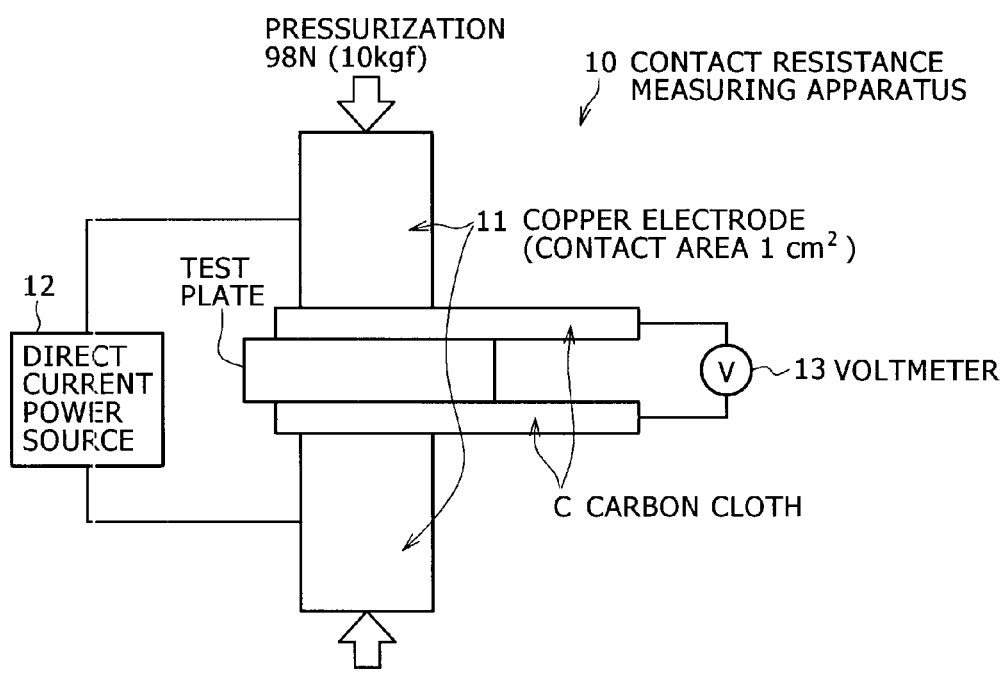
FIG. 2 is an illustrative view for illustrating a measuring method of the contact resistance.

The contact resistance value of each test plate was measured by means of a contact resistance measuring apparatus 10 shown in FIG. 2. Incidentally, FIG. 2 is an illustrative view for illustrating the measuring method of the contact resistance.

As shown in FIG. 2, the opposite sides of the test plate were sandwiched between carbon cloths C and C. Further, the outer sides thereof were pressurized under a load of 98 N (10 kgf) by a copper electrode 11 with a contact area of 1 cm², and were applied with a current of 7.4 mA by means of a direct current power source 12. Thus, the voltage to be applied across the carbon cloths C and C was measured by means of a voltmeter 13, thereby to calculate the contact resistance value.

The acceptability criterion for the electric conductivity and the corrosion resistance is as follows: the contact resistance value after 1000-hour immersion in a formic acid-methanol aqueous solution is 10 mΩ·cm² or less.

As shown in Table 1, for Examples 1 to 7, the conditions for surface treatment and the like are within the scope of the present invention. This indicates that the samples are titanium electrode materials each having a low contact resistance initial value, having a contact resistance value after 1000-hour immersion in a formic acid-methanol aqueous solution of 10 mΩ·cm² or less, and having excellent electric conductivity and corrosion resistance.

On the other hand, for Comparative Examples 1 to 3, in all cases, the contact resistance initial value was low, but the value after immersion in a formic acid-methanol aqueous solution was high. Specifically, for Comparative Example 1, the alloy layer included only Au, and hence a large number of pinholes were present in the Au film. For this reason, corrosion of the titanium base material proceeded from the pinhole areas, so that titanium in the lower part of the Au film was also corroded. As a result, Au was peeled, resulting in an increase in contact resistance. For Comparative Example 2, the atomic ratio of Au was lower than the scope of the present invention. For this reason, immersion in a formic acid-methanol aqueous solution caused oxidation of Ta to proceed, resulting in an increase in contact resistance. For Comparative Example 3, the thickness of the alloy layer was smaller than the scope of the present invention. For this reason, even when the alloy layer was formed, a large number of pinholes were present. As a result, corrosion proceeded from the pinhole areas, resulting in an increase in contact resistance.

[Second Embodiment]

In Second Embodiment, there was evaluated the effect of the heat treatment temperature of a titanium electrode material on which a heat treatment in an air atmosphere had been performed as the titanium oxide layer formation step S1.

(Surface Treatment of Test Plate)

In the same manner as in First Embodiment, a titanium base material (width 2 cm×length 5 cm×thickness 0.2 mm) including class 1 pure titanium specified according to JIS H 4600 was subjected to ultrasonic washing in acetone as the acid pickling treatment step S11. Then, the titanium base material was subjected to an acid pickling treatment in a mixed aqueous solution of 1 mass % hydrofluoric acid and 5 mass % nitric acid, was washed with pure water, and was dried. Then, as the titanium oxide layer formation step S1, a heat treatment was carried out in an air atmosphere at 500° C. for 3 minutes. The thickness of the titanium oxide layer was measured by a TEM in the same manner as in First Embodiment, and was found to be 33 nm.

Then, as the alloy layer formation step S2, in the same manner as in First Embodiment, Au60 at %-Ta40 at % alloy layers were deposited on the opposite sides of the titanium base material each including the titanium oxide layer formed thereon so that the film thickness was 10 nm by a sputtering process.

Then, as the heat treatment step S3, the titanium base material including the alloy layers formed on the opposite sides thereof was heat treated in each atmosphere (air or 0.0067 Pa vacuum), temperature, and time shown in Table 2.

Whereas, the thickness of the titanium oxide layer after the heat treatment in the heat treatment step S3 was measured in the same manner as in First Embodiment. Further, the atomic concentration ratio (O/Ti) of oxygen and titanium at a site having the maximum oxygen concentration in the titanium oxide layer was measured in the following manner.

First, by means of a fully automatic scanning type X-ray photoelectron spectrometer (Quantera SXM manufactured by Physical Electronics Co.), X-ray photoelectron spectrometry was carried out. Thus, the Ti concentration (bond energy: 450 to 460 eV) and the O concentration (bond energy: 532 to 536 eV) within the region from the outermost surface of the alloy layer to a depth of 100 nm toward the titanium oxide layer were measured. The measurement conditions for the X-ray photoelectron spectrometry were as follows. X-ray source: monochromatized Al Kα; X-ray output: 43.7 W; X-ray beam diameter: 200 μm; Photoelectron extraction angle: 45°; and Ar⁺ sputtering speed: about 4.6 nm/min in terms of $SiO_2$. Then, for five elements of Ti, O, C, Au, and Ta, the composition of the region from the outermost surface to a depth of 100 nm of each alloy layer was analyzed. Thus, using the analyzed values of the Ti concentration (atomic percent) and the O concentration (atomic percent) at a site having the maximum oxygen concentration (the position at a depth showing a peak of O (showing the maximum concentration)) in the titanium oxide layer, O/Ti was calculated.

Each of these test plates was immersed in a formic acid-methanol aqueous solution to measure the contact resistances before and after immersion in the same manner as in First Embodiment. The results are shown in Table 2.

TABLE 2

| | Heat treatment conditions | | | Thickness of titanium oxide layer after heat treatment step (nm) | O/Ti of titanium oxide layer after heat treatment step | Contact resistance (mΩ · cm²) | |
|---|---|---|---|---|---|---|---|
| | Temperature (° C.) | Time (min) | Atmosphere | | | Initial value | Immersion value |
| Example 8 | 310 | 10 | Vacuum | 30 | 1.7 | 6.4 | 6.9 |
| Example 9 | 340 | 10 | Air | 31 | 1.6 | 5.0 | 5.8 |
| Example 10 | 370 | 5 | Air | 31 | 1.5 | 4.0 | 4.3 |
| Example 11 | 500 | 2 | Vacuum | 25 | 1.4 | 3.8 | 4.0 |
| Example 12 | 630 | 1 | Vacuum | 20 | 1.1 | 4.7 | 5.9 |
| Example 13 | 700 | 1 | Vacuum | 15 | 0.52 | 5.8 | 8.7 |
| Comparative Example 4 | 850 | 1 | Vacuum | 2 | 0.15 | 6.6 | 83 |
| Comparative Example 5 | 270 | 15 | Vacuum | 33 | 2.1 | 10.5 | 11 |

As shown in Table 2, for Examples 8 to 13, the conditions for the heat treatment and the like were within the scope of the present invention. This indicates that the samples are titanium electrode materials each having a low contact resistance initial value, having a contact resistance value after 1000-hour immersion in a formic acid-methanol aqueous solution of 10 mΩ·cm² or less, and having excellent electric conductivity and corrosion resistance.

On the other hand, for Comparative Example 4, the contact resistance initial value was low, but the value after immersion in a formic acid-methanol aqueous solution was high. Whereas, for Comparative Example 5, the contact resistance was high at the initial stage, and remained high even after immersion. Specifically, for Comparative Example 4, the heat treatment temperature was higher than the scope of the present invention. For this reason, oxygen in the titanium oxide layer diffused excessively into the titanium base material, so that the thickness and O/Ti of the titanium oxide layer after the heat treatment were less than the lower limit values. Whereas, titanium in the titanium base material diffused into the alloy layer to be oxidized. For this reason, the contact resistance at the initial stage was low, but titanium diffused in the alloy layer was corroded by immersion in a formic acid-methanol aqueous solution, resulting in an increase in contact resistance. For Comparative Example 5, the heat treatment temperature was lower than the scope of the present invention. For this reason, oxygen in the titanium oxide layer did not sufficiently diffuse into the titanium base material with a 15-minute heat treatment. Accordingly, the O/Ti exceeded the upper limit value, not resulting in oxygen deficient type titanium oxide. As a result, the contact resistance at the initial stage was high, and the contact resistance remained high although the contact resistance was scarcely increased due to immersion in a formic acid-methanol aqueous solution.

[Third Embodiment]

In Third Embodiment, there was carried out the evaluation of the surface treatment method by a heat treatment in an air atmosphere as the titanium oxide layer formation step S1.

(Surface Treatment of Test Plate)

In the same manner as in First Embodiment, first, a titanium base material (width 2 cm×length 5 cm×thickness 0.2 mm) including class 1 pure titanium specified according to JIS H 4600 was subjected to ultrasonic washing in acetone as the acid pickling treatment step S11. Then, the titanium base material was subjected to an acid pickling treatment in a mixed aqueous solution of 1 mass % hydrofluoric acid and 5 mass % nitric acid, was washed with pure water, and was dried. Then, as the titanium oxide layer formation step S1, a heat treatment was carried out in an air atmosphere under the heat treatment conditions (temperature and time) shown in Table 3. The thickness of the titanium oxide layer formed on the heat treated test plate surface was measured by TEM observation in the same manner as in First Embodiment, and is shown in Table 3 together.

Then, in the same manner as in First Embodiment, 55 at % Pt-45 at % Zr alloy layers were deposited so that each film thickness was 15 nm on the opposite sides of the titanium base material heat treated in an air atmosphere by means of a magnetron sputtering apparatus.

Finally, as the heat treatment step S3, the titanium base material including the alloy layers formed on the opposite sides thereof was heat treated in vacuum (0.0067 Pa) at a temperature of 450° C. for 3 minutes.

Each of the test plates was immersed in a formic acid-methanol aqueous solution to measure the contact resistances before and after immersion in the same manner as in First Embodiment. Whereas, the thickness of the titanium oxide layer after the heat treatment in the heat treatment step S3 was measured in the same manner as in First Embodiment. The results are shown in Table 3.

Whereas, as Comparative Example 7, a test plate obtained by forming only alloy layers on a titanium base material was manufactured. First, a titanium base material (width 2 cm×length 5 cm×thickness 0.2 mm) including class 1 pure titanium specified according to JIS H 4600 was subjected to ultrasonic washing in acetone. The titanium base material was set on a substrate stage in a chamber of a magnetron sputtering apparatus. Then, the inside of the chamber was evacuated to a vacuum of 0.00133 Pa ($1 \times 10^{-5}$ Torr). Then, an argon gas was introduced into an ion gun set in the chamber, and the pressure in the chamber was adjusted to 0.267 Pa ($2 \times 10^{-4}$ Torr). Then, under the conditions of a filament current of 4.0 A, a discharge voltage of 60 V, a beam voltage of 500 V, and an accelerating voltage of 500 V, an argon ion beam was generated. Thus, the argon ion beam was applied onto the titanium base material surface at an angle of 45° for 5 minutes. As a result, a natural oxide layer on the titanium base material surface was removed.

Then, while leaving the titanium base material set in the chamber, a sputtering process was carried out under the same conditions. As a result, an alloy layer of 55 at % Pt-45 at % Zr was formed with a thickness of 15 nm on the titanium base material. Further, the titanium base material was turned upside down, removal of the titanium oxide layer and formation of an alloy layer were carried out in the same manner. Incidentally, a reference sign "-" of Comparative Example 7 in Table 3 means that an air heat treatment, measurement, and the like have not been carried out.

Then, for each test plate of Examples 14 to 18 and Comparative Example 7, the following evaluation of the hydrogen absorption resistance was performed.

(Evaluation of Hydrogen Absorption Resistance)

A test for determining the hydrogen absorption resistance was performed by measuring the hydrogen concentration of each test plate. The test plate was put in the gas phase of a closed container including water and 0.3 MPa (3 atm) hydrogen. This was heated at 150° C., thereby to be exposed in a pure hydrogen (purity 99.9%) atmosphere humidified to a humidity of about 100% for 500 hours. Then, the test plate put in a graphite crucible was molten and heated together with tin (manufactured by KOJUNDO CHEMICAL LABORATORY Co., Ltd.) in an inert gas (Ar) flow by a graphite resistance heating system. As a result, hydrogen was extracted with other gases, and the extracted gases were passed through a separating column to separate hydrogen from other gases. The separated hydrogen was transferred to a heat conductivity detector to measure the changes in heat conductivity due to hydrogen (inert gas melting—gas chromatography method). As a result, the hydrogen concentration was measured.

The hydrogen concentration is shown in Table 3. The acceptability criterion for the hydrogen absorption resistance was set as follows. The hydrogen concentration is 70 ppm or less. Incidentally, the hydrogen concentration included in a general titanium electrode material is roughly 25 to 35 ppm. Whereas, a reference sign "-" of Comparative Example 6 in Table 3 means that the hydrogen concentration has not been measured.

TABLE 3

| | Air heat treatment conditions | | Thickness of titanium oxide layer before | Thickness of titanium oxide layer after | Contact resistance ($m\Omega \cdot cm^2$) | | Hydrogen |
|---|---|---|---|---|---|---|---|
| | Temperature (° C.) | Time (min) | heat treatment step (nm) | heat treatment step (nm) | Initial value | Immersion value | concentration (ppm) |
| Example 14 | 200 | 5 | 10 | 6 | 3.7 | 3.9 | 48 |
| Example 15 | 300 | 5 | 13 | 9 | 3.9 | 4.2 | 42 |

TABLE 3-continued

|  | Air heat treatment conditions | | Thickness of titanium oxide layer before heat treatment step (nm) | Thickness of titanium oxide layer after heat treatment step (nm) | Contact resistance (mΩ·cm²) | | Hydrogen concentration (ppm) |
|---|---|---|---|---|---|---|---|
|  | Temperature (°C.) | Time (min) |  |  | Initial value | Immersion value |  |
| Example 16 | 400 | 5 | 20 | 17 | 4.7 | 4.9 | 35 |
| Example 17 | 600 | 3 | 60 | 57 | 6.8 | 7.0 | 31 |
| Example 18 | 600 | 10 | 75 | 72 | 8.9 | 9.3 | 30 |
| Comparative Example 6 | 700 | 2 | 90 | 88 | 13.8 | 14.3 | — |
| Comparative Example 7 | — | — | — | — | — | — | 354 |

As shown in Table 3, for Examples 14 to 18, the heat treatment conditions of each titanium base material were appropriate. Accordingly, the thickness of the titanium oxide layer was within the scope of the present invention. This indicates that the samples are titanium electrode materials each having a low contact resistance initial value, also having a contact resistance value after 1000-hour immersion in a formic acid-methanol aqueous solution of 10 mΩ·cm² or less, and having excellent electric conductivity and corrosion resistance. Further, the samples were confirmed to be low in hydrogen concentration, and to hardly absorb hydrogen.

On the other hand, for Comparative Example 6, the treatment temperature in the titanium oxide layer formation step S1 (heat treatment in an air atmosphere) was high. As a result, the titanium oxide layer was formed with a large thickness exceeding the scope of the present invention. This conceivably resulted in reduction of the electric conductivity. For this reason, the initial value and the immersion value of the contact resistance were found to be high. Whereas, for Comparative Example 7 including no titanium oxide layer between the alloy layer and the titanium base material, the hydrogen concentration was high, indicating that the sample apparently absorbed hydrogen. This causes a concern about embrittlement due to absorption of hydrogen in the long view as the titanium electrode material for Comparative Example 7.

[Fourth Embodiment]

In a fourth embodiment, there was carried out evaluation of a surface treatment method by an anodic oxidation treatment as the titanium oxide layer formation step S1.

(Surface Treatment of Test Plate)

Each test plate used was treated in the following manner. A titanium base material (width 2 cm×length 5 cm×thickness 1 mm) including class 1 pure titanium specified according to JIS H 4600 was subjected to ultrasonic washing in acetone as the acid pickling treatment step S11. Then, the titanium base material was subjected to a first acid pickling treatment in a 4 mass % hydrofluoric acid aqueous solution. Then, it was subjected to a second acid pickling treatment in a mixed aqueous solution of 0.5 mass % hydrofluoric acid and 5 mass % hydrogen peroxide, and then was washed with pure water, and was dried. Then, as the titanium oxide layer formation step S1, an anodic oxidation treatment was carried out at each voltage and for each retention time shown in Table 4 in a room-temperature 1 mass % phosphoric acid aqueous solution. The thickness of the titanium oxide layer formed on the test plate surface subjected to the anodic oxidation treatment was measured by TEM observation in the same manner as in First Embodiment, and is shown together in Table 4.

Then, on each titanium base material after titanium oxide layer formation, 50 at % Au-50 at % Zr was deposited so that the film thickness was 10 nm in the alloy layer formation step S2 in the same manner as in First Embodiment. Then, the heat treatment step S3 was carried out under respective conditions shown in Table 4, thereby to form each test plate. Further, the thickness of the titanium oxide layer after the heat treatment in the heat treatment step S3 was measured in the same manner as in First Embodiment.

(Evaluation)

For each test plate, as evaluations of the electric conductivity and the corrosion resistance, the contact resistance initial value and the contact resistance value after 1000-hour immersion in a formic acid-methanol aqueous solution were measured, respectively, in the same manner as in First Embodiment. Whereas, as evaluation of the hydrogen absorption resistance, the hydrogen concentration of each test plate after 500-hour exposure to hydrogen at 150° C. was measured in the same manner as in Third Embodiment. The contact resistance values and the hydrogen concentrations of the test plates are shown in Table 4.

TABLE 4

|  | Anodic oxidation conditions | | Thickness of titanium oxide layer before heat treatment step (nm) | Heat treatment conditions | | | Thickness of titanium oxide layer after heat treatment step (nm) | Contact resistance (mΩ·cm²) | | Hydrogen concentration (ppm) |
|---|---|---|---|---|---|---|---|---|---|---|
|  | Voltage (V) | Time (min) |  | Oxygen partial pressure (Pa) | Temperature (°C.) | Time (min) |  | Initial value | Immersion value |  |
| Example 19 | 20 | 20 | 15 | 0.133 | 380 | 10 | 12 | 4.2 | 4.5 | 42 |
| Example 20 | 50 | 20 | 41 | 1.33 | 450 | 5 | 39 | 4.5 | 4.6 | 35 |
| Example 21 | 80 | 20 | 68 | 0.0133 | 500 | 5 | 60 | 6.6 | 6.8 | 30 |
| Example 22 | 100 | 20 | 80 | 13.3 | 400 | 5 | 75 | 9.0 | 9.3 | 30 |
| Comparative Example 8 | 120 | 20 | 95 | 0.0133 | 400 | 5 | 89 | 17.3 | 17.5 | 28 |

As shown in Table 4, for Examples 19 to 22, the conditions for the anodic oxidation treatment were appropriate. Accordingly, the thickness of each titanium oxide layer was within the scope of the present invention. This indicates that the samples were titanium electrode materials each having a low contact resistance initial value, also having a contact resistance value after 1000-hour immersion in a formic acid-methanol aqueous solution of 10 mΩ·cm$^2$ or less, and having excellent electric conductivity and corrosion resistance. Further, it was confirmed as follows. All the samples were titanium electrode materials each having a hydrogen concentration value as low as 42 ppm or less, and also hardly absorbing hydrogen by the titanium oxide layer formed by the anodic oxidation treatment, and being excellent in hydrogen absorption resistance.

On the other hand, for Comparative Example 8, the voltage in the anodic oxidation treatment was high. As a result, the titanium oxide layer was formed with a large thickness exceeding the scope of the present invention. This conceivably resulted in reduction of the electric conductivity. For this reason, the initial value and the immersion value of the contact resistance were more than 10 mΩ·cm$^2$.

ness of the titanium oxide layer formed on the test plate surface subjected to the oxidation treatment was measured by TEM observation in the same manner as in First Embodiment, and is shown together in Table 5.

Then, each titanium base material after titanium oxide layer formation, 50 at % Au-50 at % Hf was deposited so that the film thickness was 10 nm in the alloy layer formation step S2 in the same manner as in First Embodiment. Then, the heat treatment step S3 was carried out under respective conditions shown in Table 5. Further, the thickness of the titanium oxide layer after the heat treatment in the heat treatment step S3 was measured in the same manner as in First Embodiment.

(Evaluation)

As evaluations of the electric conductivity and the corrosion resistance, the contact resistance initial value and the contact resistance value after 1000-hour immersion in a formic acid-methanol aqueous solution were measured, respectively, in the same manner as in First Embodiment. Whereas, as evaluation of the hydrogen absorption resistance, the hydrogen concentration of each test plate after 500-hour exposure to hydrogen at 150° C. was measured in the same manner as in Third Embodiment. The contact resistance values and the hydrogen concentrations are shown in Table 5.

TABLE 5

| | Conditions for oxidation treatment in a passive state forming atmosphere | | Thickness of titanium oxide layer before heat treatment step (nm) | Heat treatment conditions | | | Thickness of titanium oxide layer after heat treatment step (nm) | Contact resistance (mΩ·cm$^2$) | | Hydrogen concentration (ppm) |
|---|---|---|---|---|---|---|---|---|---|---|
| | Temperature (° C.) | Time (h) | | Oxygen partial pressure (Pa) | Temperature (° C.) | Time (min) | | Initial value | Immersion value | |
| Example 23 | 50 | 240 | 25 | Air | 400 | 5 | 22 | 4.3 | 4.6 | 42 |
| Example 24 | 100 | 240 | 40 | 0.133 | 400 | 5 | 37 | 4.8 | 5.1 | 35 |
| Example 25 | 150 | 240 | 68 | 0.0133 | 400 | 5 | 62 | 6.9 | 7.0 | 30 |
| Comparative Example 9 | 200 | 240 | 97 | 0.0067 | 400 | 5 | 90 | 15.0 | 15.3 | 30 |

[Fifth Embodiment]

In a fifth embodiment, there was carried out evaluation of a surface treatment method by an oxidation treatment in a passive state forming atmosphere as the titanium oxide layer formation step S1.

(Surface Treatment of Test Plate)

Each test plate used was treated in the following manner. First, a titanium base material (width 2 cm×length 5 cm×thickness 1 mm) including class 1 pure titanium specified according to JIS H 4600 was subjected to ultrasonic washing in acetone as the acid pickling treatment step S11. Then, the titanium base material was subjected to an acid pickling treatment in a mixed aqueous solution of 1 mass % hydrofluoric acid and 5 mass % nitric acid, was washed with pure water, and was dried. Then, as the titanium oxide layer formation step S1, an oxidation treatment was carried out in a passive state forming atmosphere. In a container made of titanium and with a volume of 0.3 L subjected to Teflon (registered trademark) lining, the titanium base material and a 0.2 L hydrochloric acid aqueous solution (pH 2) were put, and the container was closed. Then, the container was immersed in pure water put in an autoclave made of titanium. Thus, the autoclave was closed, and was held at each temperature and for each retention time shown in Table 5. Then, the autoclave and the container made of titanium were opened, thereby to take out the titanium material. The titanium material was washed with pure water, and was dried, resulting in a titanium base material subjected to an oxidation treatment. The thick- As shown in Table 5, for Examples 23 to 25, the initial value of the contact value was low, and the contact resistance value after 1000-hour immersion in a formic acid-methanol aqueous solution was also 10 mΩ·cm$^2$ or less. This indicates that the samples were titanium electrode materials having excellent electric conductivity and corrosion resistance. Further, it was confirmed as follows. All the samples were titanium electrode materials each having a hydrogen concentration value as low as 42 ppm or less, and also hardly absorbing hydrogen by the titanium oxide layer formed by the oxidation treatment in a passive state forming atmosphere, and being excellent in hydrogen absorption resistance.

On the other hand, for Comparative Example 9, by the oxidation treatment in a passive state forming atmosphere, the titanium oxide layer was formed with a large thickness exceeding the scope of the present invention. This resulted in reduction of the electric conductivity. For this reason, the contact resistance exceeded 10 mΩ·cm$^2$ in terms of the initial value and the immersion value.

Up to this point, the titanium electrode material and the surface treatment method of the titanium electrode material in accordance with the present invention were described specifically by way of the best mode for carrying out the invention and Embodiments. However, the gist of the present invention is not limited to the description, and must be construed based on the description of the appended claims. Further, it is naturally understood that various changes, modifications, and the like based on the description are also included in the gist of the present invention.

What is claimed is:

1. A titanium electrode material, comprising:
   a titanium material comprising pure titanium or a titanium alloy;
   a titanium oxide layer having a thickness of 3 nm or more and 75 nm or less, and having an atomic concentration ratio (O/Ti) of oxygen and titanium at a site having the maximum oxygen concentration in the layer of 0.3 or more and 1.7 or less, on the surface of the titanium material; and
   an alloy layer comprising at least one noble metal selected from the group consisting of Au, Pt, and Pd, and at least one non-noble metal selected from the group consisting of Zr, Nb, Ta, and Hf, having a content ratio of the noble metal and the non-noble metal (noble metal:non-noble metal) of 35:65 to 95:5 by atomic ratio, and having a thickness of 2 nm or more, on the titanium oxide layer.

2. A surface treatment method of forming the titanium electrode material of claim 1, the method comprising:
   forming the titanium oxide layer with a thickness of 10 nm or more and 75 nm or less on the surface of the titanium material;
   forming the alloy layer by a PVD process, on the titanium oxide layer; and
   heat treating a resulting titanium material further comprising an alloy layer formed thereon at a temperature of 300° C. or more and 800° C. or less.

3. The method of claim 2, wherein the titanium oxide layer is formed by heat treating the titanium material at a temperature of 200° C. or more and 600° C. or less in air.

4. The method of claim 2, wherein the forming of the titanium oxide layer comprises anodically oxidizing the surface of the titanium material at a voltage of 100 V or less.

5. The method of claim 2, wherein the forming of the titanium oxide layer comprises oxidatively treating the titanium material in a passive state forming atmosphere of titanium.

6. The method of claim 2, further comprising removing a natural oxide layer from the surface of the titanium material by acid pickling in a solution comprising a non-oxidizing acid before the forming of the titanium oxide layer.

7. The titanium electrode material according to claim 1, wherein the titanium oxide layer has the atomic concentration ratio (O/Ti) of oxygen and titanium at a site having the maximum oxygen concentration in the layer of 1.0 or more and 1.5 or less, on the surface of the titanium material.

8. The titanium electrode material according to claim 1, wherein the alloy layer comprises Pd, and at least one non-noble metal selected from the group consisting of Zr, Nb, Ta, and Hf, and has a content ratio of the noble metal and the non-noble metal (noble metal:non-noble metal) of 35:65 to 95:5 by atomic ratio, and a thickness of 2 nm or more, on the titanium oxide layer.

* * * * *